July 20, 1943. R. L. COOPER Re. 22,351

AIRPLANE PACKAGE TRANSFER APPARATUS

Original Filed May 25, 1940 3 Sheets-Sheet 1

Inventor
Roy L. Cooper,
By John L. Woodward
Attorney

AIRPLANE PACKAGE TRANSFER APPARATUS

Original Filed May 25, 1940 3 Sheets-Sheet 2

Inventor

Roy L. Cooper,

By John L. Woodward

Attorney

July 20, 1943. R. L. COOPER Re. 22,351
AIRPLANE PACKAGE TRANSFER APPARATUS
Original Filed May 25, 1940 3 Sheets-Sheet 3
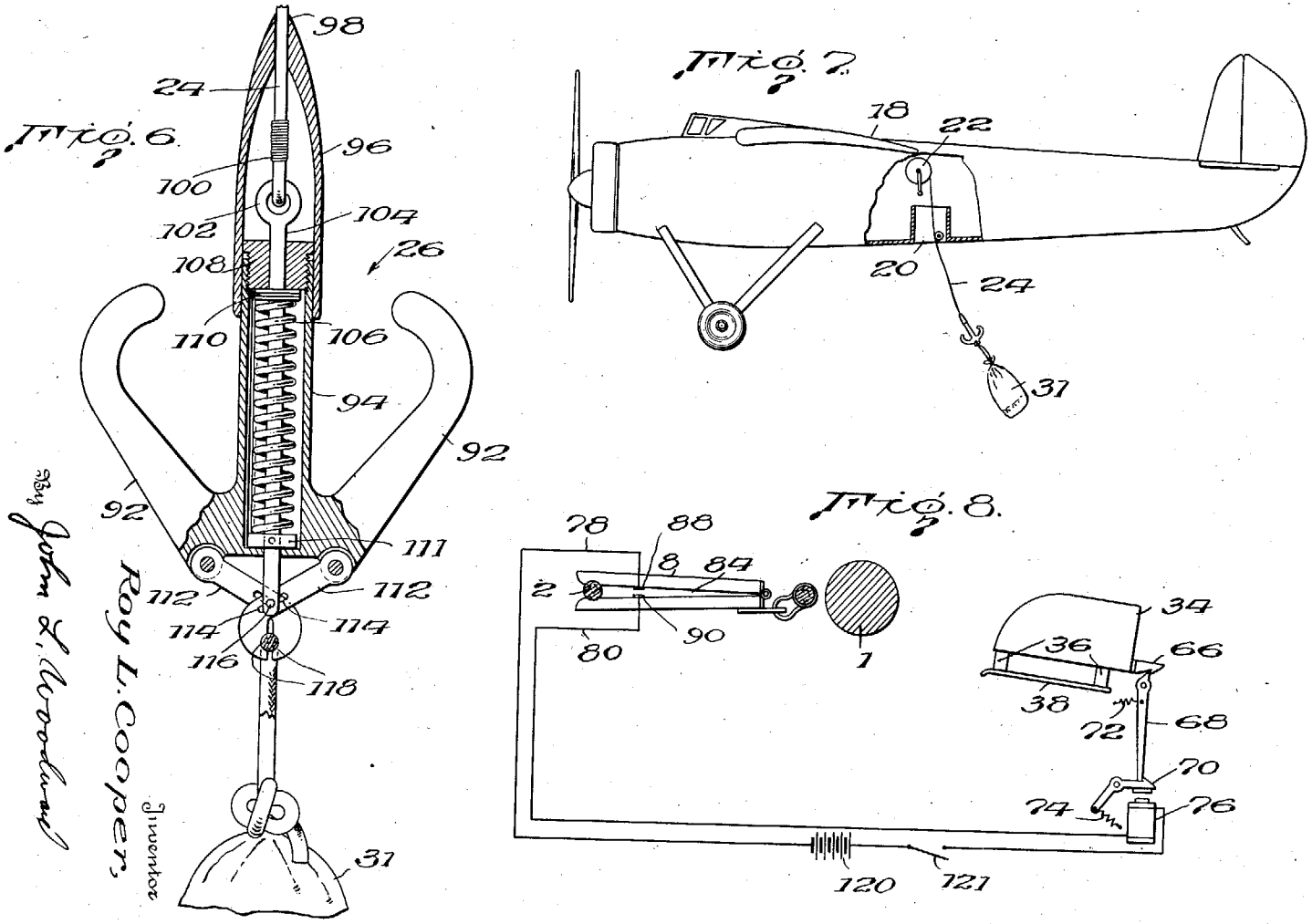

Reissued July 20, 1943

Re. 22,351

UNITED STATES PATENT OFFICE 22,351

AIRPLANE PACKAGE TRANSFER APPARATUS

Roy L. Cooper, Sheffield, Ill.

Original No. 2,250,153, dated July 22, 1941. Serial No. 337,283, May 25, 1940. Application for reissue June 22, 1942, Serial No. 448,010

13 Claims. (Cl. 258—1.6)

The present invention relates to a catapult pick-up mechanism designed particularly for use in connection with aircraft so that an aircraft may pick up any desired materials from the ground such as air mail, gasoline, express and the like without the necessity of taking the time to land and take off, thus continuing in uninterrupted flight.

The prime object of the invention resides in the provision of means for raising and holding in position a flexible loop which may be engaged by a grapple hook of an aircraft mechanism which is so designed that an incoming package on an aircraft is automatically released and an electrical circuit is energized by means of which a catapult is caused to be released at an advanced time interval so that the catapult has the proper amount of time in which to accelerate the package to be picked up.

Another important object of this invention is the provision for means of predetermining the setting of the catapult and timing mechanism so that any package up to maximum weight may be catapulted at the proper speed to prevent unnecessary and undesirable jerk upon the airplane.

A further object of this invention resides in the arrangement of ground mechanism and in the mounting of the loop thereof so that when the grapple of the aircraft device contacts the loop there is no possibility of the loop becoming entangled in any way.

A still further object of the invention resides in the provision of an apparatus of this nature which is exceedingly simple to construct and to operate, strong and durable, thoroughly efficient, effective and reliable in operation and otherwise well adapted to the purpose for which it is designed.

A further object of this invention resides in an apparatus of this nature which will automatically release a package or sack so that it will fall upon a net provided for the purpose of absorbing shock and preventing damage thereto.

A further important object of this invention resides in the provision of a net which is so constructed that it will receive the package dropped with no damage thereto.

A further object of this invention resides in the method of housing the catapult mechanism beneath a slanting roof so that there is no possibility of snagging the grapple or incoming bag when making a pickup.

Further aims and advantages appear in connection with the following description of the illustrative embodiment of the invention shown in the accompanying drawings, wherein .

Figure 1 is a view in perspective and in side elevation of an airplane and its pickup device, and of the ground mechanism, and of the net for receiving the incoming packages and the like.

Figure 3 is fragmentary view of one of the poles disclosing the special contact clip and one of the regular clips holding a portion of the loop.

Figure 6 is an elevational view of the grapple hook of the airplane mechanism.

Figure 7 is a side elevational view, parts broken away, showing winding drum and associated parts.

Figure 8 is a diagrammatical view timing mechanism and its electrical circuit.

Figure 1:
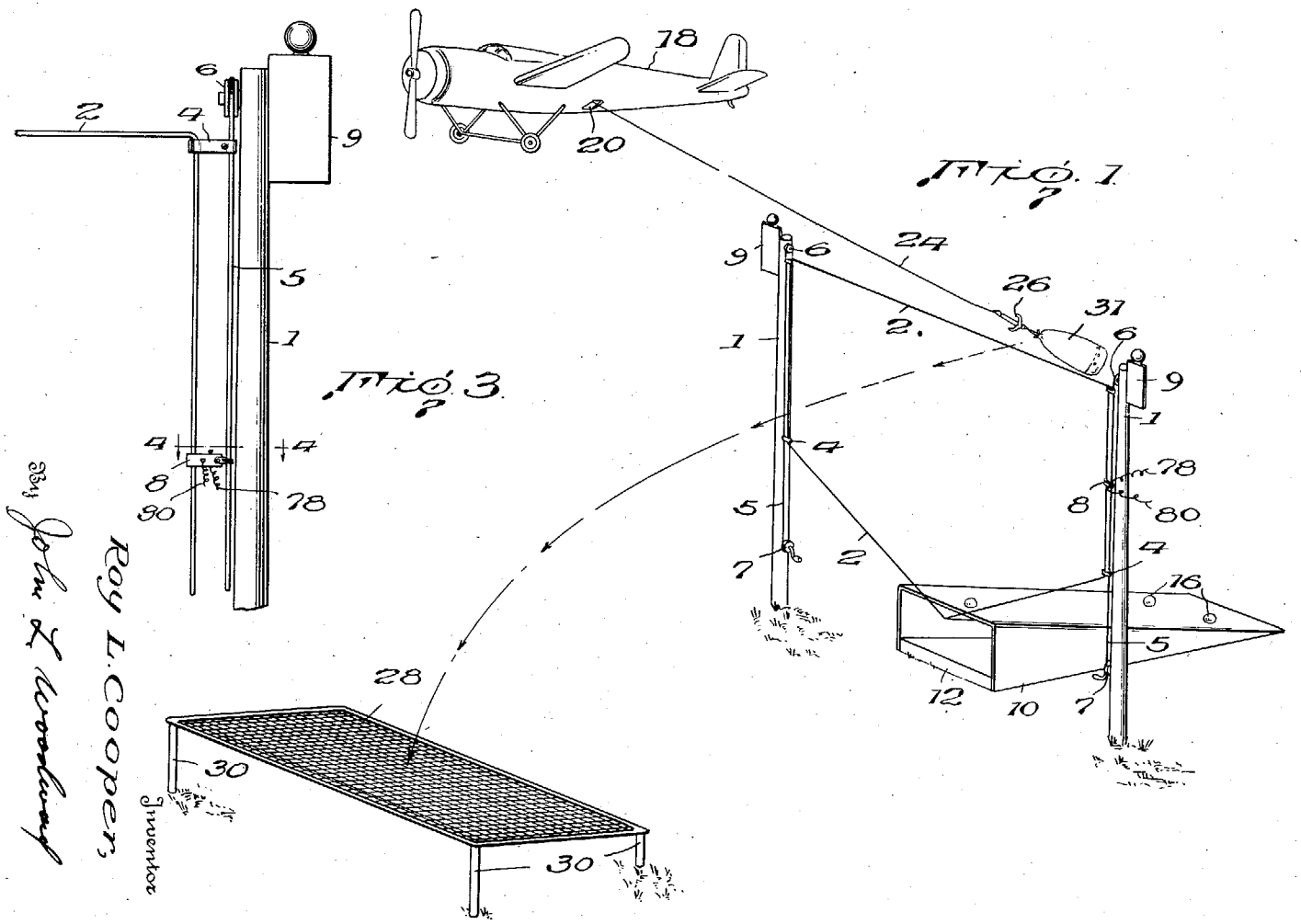

Referring to the drawings in detail 1 designates poles or upright members which are preferably set in concrete in the ground. The numeral 2 refers to a flexible loop which is held in position by clip members 4, and the clip members 4 are secured to elevating ropes 5. There is an elevating rope secured to each of the poles 1. Each elevating rope 5 consists of a loop of rope mounted on a pulley 6 secured near the top of each pole 1, and also adapted to be wound around a crank pulley 7 mounted near the base of each pole 1.

A special contact clip 8 is also secured to one of the elevating ropes 5 and adapted to engage the flexible loop 2. White light 9 are secured on the outside of each pole near the top thereof. A slanting metal housing 10 having an open front portion 12 is adapted to protect the catapult mechanism 14. The slanting shed have lights 16 mounted thereon. An airplane 18 of the usual commercial construction now employed in air mail service is designated in Figure 1. The airplane 18 is shown with an opening 20. The airplane 18 has a reel member 22 mounted therein which carries a grapple cable 24 having a grapple hook 26 secured to its lower end. A net 28 supported upon posts 30 is located approximately 150 feet in front of the catapult mechanism 14 so that it may be properly positioned to receive the incoming package 31.

Figure 2:
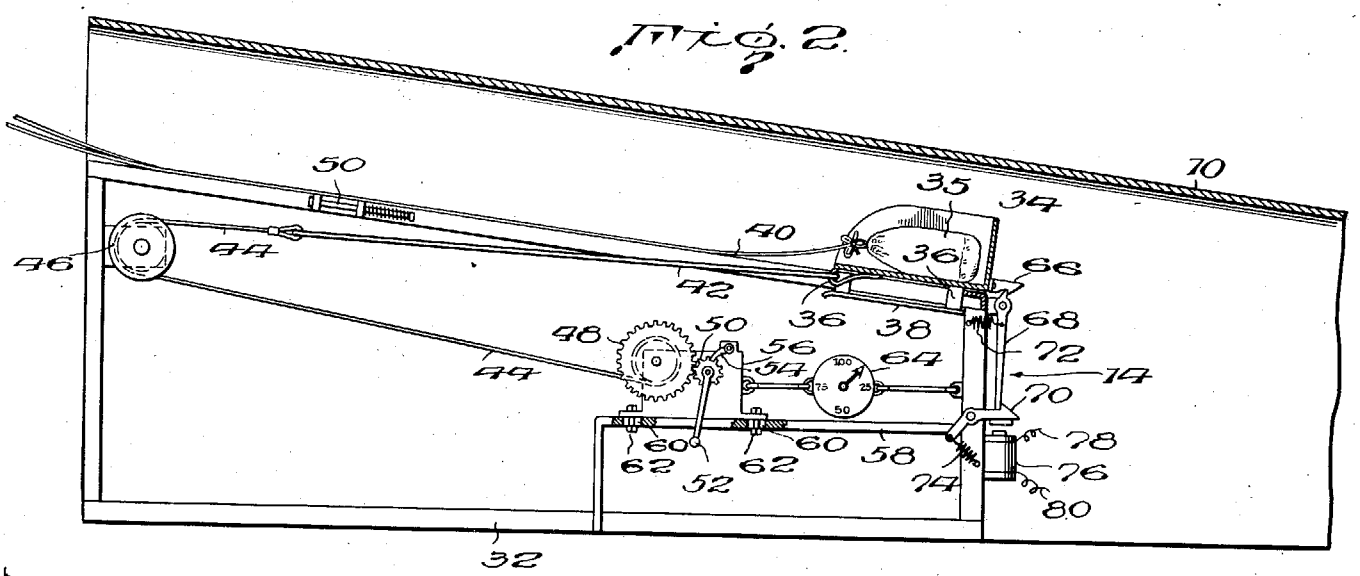
Figure 2 is a view showing a vertical sectional view of the timing mechanism and of the catapult mechanism.
Figure 5:
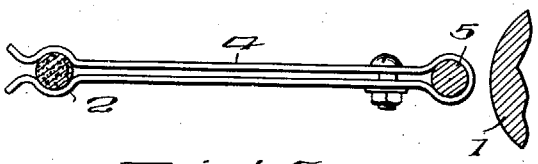
Figure 5 is an enlarged view of one of the clip members shown mounted on an elevating rope and having the flexible loop position therein.

In Figure 2 is shown the catapult mechanism 14 in detail. The catapult mechanism is mounted on a steel frame structure 32. The package carriage of the catapult is designated 34, and has a package 35 therein. The package carriage 34 has vertical guides 36 secured to the front and rear portion of the bottom thereof. The vertical guides 36 of the package carriage 34 are attached to a shoe member 38 located beneath a double track 40 upon which the package carriage 34 is adapted to move or operate. An elastic connecting means 42 is attached to the front of the package carriage 34 and is connected at the other end to a steel cable 44. The steel cable is mounted around a spool member 46, and the steel cable terminates by being secured to a windlass drum 48. A spring means or shock absorber 50 for stopping the forward movement of the catapult carriage 34, is interposed just behind the location where the flexible connecting means 42 and the steel cable 44 are secured together. The windlass drum 48 has a rotatable tooth member which is adapted to be engaged by a pinion 51. The pinion 51 is adapted to be operated by a crank 52. A pawl 54 is adapted to engage the pinion 51. The windlass drum 48 and pinion 50 are secured to framework 56, and this framework 56 is slidably mounted upon a base member 58. The base member 58 has two apertures or slots 60 for receiving pin member means 62 of the framework 56. A spring scales 64 for registering tension calibrated in terms of package load is connected to the frame-work 56 carrying the windlass drum 48, and is also connected to the steel frame 32. The package carriage 34 of the catapult 14 has a rigid catch 66 secured to its rear end and the upper end of a pivoted lever 68 is adapted to engage the catch 66 on the package carriage 34. A pivotal catch 70 is mounted on the steel frame member 32, and the lower end of the pivoted lever 68 is adapted to engage the pivotal catch 70. The pivoted lever 68 has a spring 72 for aiding in returning it to normal position and also to serve as an anchoring means therefor. The pivotal catch 70 also has a spring 74 for returning it to normal position. An electrical magnet is designated 76 and is shown located in the rear of the steel frame 32.

In Figure 3 is shown the upper portion of one of the upright members 1 having a light direction signal 9 mounted thereon. It also shows a portion of the loop 2 in operative position with a clip 4 and special contact clip 8 thereon, and showing the clips 4 and 8 secured to the elevating rope 5. Electrical conductors 78 and 80 are shown attached to the special contact clip 8.

Figure 4:
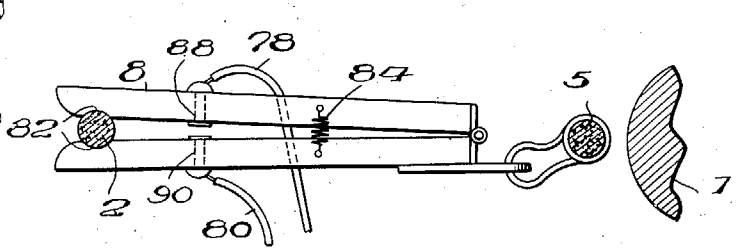
Figure 4 is side elevation view of the special contact clip.

Figure 4 shows the special contact clip on an enlarged scale. The flexible cable 2 is shown mounted in notches 82 in the ends of the clip arms. When the flexible cable 2 is mounted therein, the contacts 88 and 90 are out of contact. The spring 84 will pull the contacts 88 and 90 into engagement when the flexible cord loop 2 is pulled out of the special contact clip 8.

Figure 6 shows on an enlarged scale the grapple hook 26. The grapple hook 26 has extending arms 92. The hook also comprises a hollow cylindrical body portion 94. A streamlined shield 96 is secured to the upper portion of the cylindrical body portion 94 of the grapple hook 26. The upper end of the streamlined shield 96 has an aperture 98 through which extends the lower end of the grapple cable 24. The grapple cable 24 has a loop 100 on its lower end which is housed in the streamlined shell 96. The loop 100 of the grapple cable 24 is secured to an eye member 102 of shaft 104. The shaft 104 has a spring member 106 spaced about it and at the upper end of the shaft 104 is a female nut 108 which threads into the upper end of the cylindrical body 94. A series of washers 110 are spaced between the female nut 108 and the spring 106 so that different degrees of tension can be had on the said spring. The lower end of the shaft 104 extends through the lower end of the cylindrical body 94 of the grapple hook 26. A pair of clutch arms 112 are pivoted to the said arms 92 of the grapple hook 26. Each of the clutch arms 112 has a slot 114, and a pin 116 mounted on the lower end of the shaft 104 is adapted to ride in said slots of the clutch arms. The clutch arms have notches 118 in their lower ends and they form an aperture to hold the ring of a mail bag which is to be discharged from the incoming airplane. A collar 111 is secured to the shaft 104 in the lower end of the cylindrical body portion 94 of the grapple hook 26, and spring means 106 is secured to the collar 111. The spring means 106 assists the clutch jaws 112 in holding the incoming package 31 until sufficient force to overcome the tension of spring 106 is transmitted to the clutch jaws 112 to release the incoming package.

In Figure 8 is shown a diagrammatical view of the special contact clip 8 spaced on the flexible loop member 2, and the contact members 88 and 90 being out of contact. This figure also shows the electrical conductors 78 and 80 connected with electrical magnet means 76, and the pivoted lever 68 shown in engagement with the catch 66 of the package carrier 34, and in engagement with the pivotal catch spaced on the steel frame 32 just above the electrical magnet 76. A battery 120 is shown, and also a manual switch 121 which is located at the rear of the shed 10. The switch 121 is adapted to be opened while the catapult mechanism 14 is being set for propelling a package.

In disclosing the pertinent features connected with the construction and operation of my improved apparatus for picking up objects by an airplane in motion from a stationary point, certain factors relative to feasibility, safety and practicability must be observed. For safe and feasible operation of an airplane close to the ground with the express intention to continue in flight when carrying a relatively full load, a speed of not much less than one hundred miles per hour must be maintained. The practicability of my machine not only resides in the fact that the mechanism actually operates successfully but that it is constructed to meet this rigid requisite of safe flying speed and at the same time allow the versatile pickup of small or comparatively large packages with the same apparatus. Since the speed of one hundred miles per hour represents approximately one hundred and fifty feet per second, it can at once be seen that for satisfactory and feasible operation, the catapult must project the object into space in the general direction of the flight of the airplane at a speed which will approximate one hundred and fifty feet per second.

When a catapult is constructed for the purpose of accelerating any object into space, the design of the catapult will be limited or dependent upon the element of time during which the object is accelerated. For example; if it is desired to accelerate a weight of one hundred pounds from zero to one hundred and fifty feet per second, the ultimate momentum of the object will be 150×100 or 15,000 foot pounds. If the weight of 100 pounds is to acquire this momentum practically instantaneously, the required push of the catapult would be terrific. If the element of time is extended the object will travel a correspondingly greater distance during its acceleration but the required energy will be correspondingly less. By actual calculation, provided a definite time element is established during which the process of acceleration may take place, the catapult may be designed on sound calculations to meet the desired requirements. I have found that in actual operation, using poles of adequate height and placed at a distance apart entirely feasible to meet the requirements of pickup work that the loop 2 indicated in my apparatus is straightened out to full length where all slack is taken up in a period which represents ⅓ of a second of time when the airplane is traveling 100 miles per hour. With these pertinent facts, I have constructed a catapult which is capable of meeting all requirements up to a load of 100 pounds, the required acceleration of which can be accomplished within the required time of ⅓ of a second.

The operation of the apparatus is as follows: The weight of the object 35 which is to be picked up is determined by weighing upon a scale (not shown) which is located near the catapult. The crank pulleys 7 are operated so that the elevating ropes 5 carry the clips 4 down within reach of a person. Then the flexible pickup loop 2 is placed in the clips 4, and in the special contact clip 8, according to marks on the flexible loop 2. The flexible loop 2 with the clips attached thereto is drawn up in operative position by the operation of the hand pulleys 7, as shown in Figure 1. Now snap or fasten the bag 35 on the end of the loop 2 extending into the housing 10, and place the bag on the carrier 34 within the housing 10. Set the pivoted lever 68 to engage the catch 66 on the rear of the package carrier 34, and also set the lever or catch 70 to engage the other end of the pivoted lever 68. Turn the handle 52 so that the pinion 51 will engage the toothed member of the windlass drum so that the windlass drum is cranked so that the proper tension is established through the metal cable 44 and the flexible connector 42 on the package carrier 34, as will be ascertained on the dial of the spring scales 64, the said tension being proper for the load which has been weighed and placed in the package carrier 34. The tension is transferred from the frame-work 56 of the windlass drum 48 to the scales 64, because the frame-work 56 is adjustably mounted on the base member 58. If it is dark and added lights are needed, then the lights 9 and 16 are turned on.

When the airplane 18 is approaching for a pickup and also dropping of a load, the operator in the plane will snap the sack 31 to be dropped, into the apertures 118 in the clutch jaws 112 of the grapple hook 26 and lower it through the opening 20 in the airplane 18 to a certain distance which is practical for contacting the flexible loop 2 while flying at a safe altitude above the poles 1. Then the following occurs practically instantaneously; when the grapple hook 26 strikes the upper horizontal portion of the flexible pickup loop 2, the loop slides down to rest upon one or both of the grapple arms 92. At the instant the loop 2 is struck by the grapple hook 26, it is jerked from the holding clips 4, and from the special contact clip 8. As soon as the flexible loop 2 is jerked from the special contact clip 8, the spring 84 of the special contact clip will pull the arms thereof together and the contact points 88, and 90 will meet and complete the circuit to the electrical magnet 76 and this will actuate the lever or catch 70 and then the pivoted lever 68 is released from the catch 66 on the package carriage 34, and the carriage 34 is then pulled forward by the tension on the cables 42 and 44. During the period of a fraction of a second, as indicated in this setup to be ⅓ of a second, the airplane 18 travels forward 50 feet, the slack is taken out of the flexible loop 2, or in other words the loop is now drawn taut by the forward motion of the airplane, the package 35 has been accelerated or pulled forward by the cable 44 and the flexible connector 42 and is emerging from beneath the shed 10 and at the instant when the slack is taken up, the jerk of the bag 35 is sufficient on the arms 92 of the grapple hook 26 to overcome the pull of spring 106 on the clutch jaws 112 and thus open the clutch jaws and release the incoming package 31 so as to fall and land upon the net 28.

I have entered into the description of construction and relative arrangement of parts and also into somewhat limiting discussion of the time element to set forth a sound foundation of feasibility, but I do not desire to be understood however as confining myself to the specific construction and relative arrangements of parts as set forth therein inasmuch as the future practice in the use of the invention may require various modifications which may fall within the scope of my invention and appended claims.

Having thus described my invention, what I claim is new is:

1. Apparatus for transferring articles to a moving airplane, comprising a cable having a grapple hook secured thereto suspended from the airplane, a pair of rigid supports stationary with respect to the ground, a flexible loop suspended from said rigid supports, said loop having means for securing an outgoing article thereto, a catapult mechanism for propelling the outgoing article, said catapult mechanism positioned to receive the outgoing article secured to the loop, latch means for holding the catapult mechanism in retracted position, electrical means for releasing the latch means including a switch means, and means suspended from the rigid supports and including a portion of the loop for closing the switch means whereby the pull of the cable or hook on the said loop closes said switch means thereby releasing the catapult mechanism for throwing the outgoing article in the direction of the line of flight of the airplane.

2. Apparatus for transferring articles to a moving airplane, comprising a cable having a grapple hook secured thereto suspended from the airplane, a pair of rigid supports stationary with respect to the ground, a flexible loop suspended from said rigid supports, said loop having means for securing an outgoing article thereto, a catapult mechanism for propelling the outgoing article, said catapult mechanism positioned to receive the outgoing article secured to the loop, latch means for holding the catapult mechanism in retracted position, electrical means for releasing the latch means including a pair of contacts normally biased to closed position, said loop member spacing the contacts apart whereby when the grapple hook or cable engages the loop the contacts are closed thereby releasing the catapult mechanism for throwing the outgoing article in the direction of the line of flight of the airplane.

3. Apparatus for transferring articles to a moving airplane, comprising a cable having a grapple hook secured thereto suspended from the airplane, a pair of rigid supports stationary with respect to the ground, raising and lowering means mounted on said rigid supports, a flexible loop suspended from said raising and lowering means mounted on the rigid supports, said loop having means for securing an outgoing article thereto, a catapult mechanism for propelling the outgoing article, said catapult mechanism positioned to receive the outgoing article secured to the loop, latch means for holding the catapult mechanism in retracted position, electrical means for releasing the latch means including a switch means secured to the raising and lowering means, and means suspended from the raising and lowering means mounted on the rigid supports and including a portion of the loop for closing the switch means whereby the pull of the cable or hook on the said loop closes said switch means thereby releasing the catapult mechanism for throwing the outgoing article in the direction of the line of flight of the airplane.

4. Apparatus for transferring articles to and from a moving airplane, comprising a cable having a grapple hook secured thereto and including release means suspended from the airplane, the release means of the grapple hook adapted to carry an incoming article, a pair of rigid supports stationary with respect to the ground, a flexible loop suspended from said rigid supports, said loop having means for securing an outgoing article thereto, a catapult mechanism for propelling the outgoing article, said catapult mechanism positioned to receive the outgoing article secured to the loop, latch means for holding the catapult mechanism in retracted position, electrical means for releasing the latch means including a pair of contacts normally biased to closed position, said loop spacing the contacts apart whereby when the grapple hook or cable engages the loop the contacts are closed thereby releasing the catapult mechanism for throwing the outgoing article in the direction of the line of flight of the airplane, and when the grapple hook has assumed the load of the outgoing article the incoming article is released from the release connection of the grapple hook.

5. Apparatus for transferring articles to a moving airplane, comprising a cable having a grapple hook secured thereto suspended from the airplane, a pair of rigid supports stationary with respect to the ground, a flexible loop suspended from said rigid supports, said flexible loop having means for securing an outgoing article thereto, a catapult mechanism including an adjustable tensioning mechanism and an indicator for properly propelling the outgoing article, said catapult mechanism positioned to receive the outgoing article secured to the loop, latch means for holding the catapult mechanism in retracted position, electrical means for releasing the latch means including a pair of contacts normally biased to closed position, said loop member spacing the contacts apart whereby when the grapple or cable engages the loop the contacts are closed thereby releasing the catapult mechanism for throwing the outgoing article in the direction of the line of flight of the airplane.

6. Apparatus for transferring articles to a moving airplane, comprising a catapult for propelling the article, a pair of relatively rigid spaced supports stationary with respect to the ground, a flexible loop having a portion adapted for connection with the article and a portion adapted to be suspended with respect to said supports, a loop engaging device adjacent and supported by one of said supports at a point spaced a substantial distance above the lower end thereof and engaging the suspended portion of said loop, and means operatively connected to said engaging device and operative by said engaging device upon the pulling of the suspended portion of said loop by an airplane-carried element, for rendering said catapult effective for projecting the article.

7. Apparatus for transferring articles to a moving airplane, comprising a catapult for propelling the article, a pair of relatively rigid spaced supports stationary with respect to the ground, a flexible loop having a portion adapted for connection with the article and a portion adapted to be suspended with respect to said supports, a loop engaging device adjacent and supported by one of said supports at a point spaced a substantial distance above the lower end thereof and engaging the suspended portion of said loop, said engaging device having an element movable upon the transmission of a pull to the suspended portion of said loop by an airplane-carried element, and means operatively connected to the movable element of said engaging device and operative by such movable element upon the pulling of the suspended portion of the loop for rendering said catapult effective for propelling the article.

8. Apparatus for transferring articles to a moving airplane, comprising a catapult for propelling the article, a pair of relatively rigid spaced supports stationary with respect to the ground, a flexible loop having a portion adapted for connection with the article and a portion adapted to be suspended with respect to said supports, a loop engaging device adjacent and supported by one of said supports at a point spaced a substantial distanec above the lower end thereof and engaging the suspended portion of said loop, said engaging device being so constructed and arranged that the suspended portion of the loop will be freed therefrom upon the exertion of a pull on the suspended portion of the loop, and means operatively connected to said engaging device and operative by said engaging device upon the pulling of the suspended portion of said loop by an airplane-carried element, for rendering said catapult effective for projecting the article.

9. Apparatus for transferring articles to a moving airplane comprising a catapult, means for exerting a propelling force tending to operate said catapult to project an article carried thereby, a latch for holding said catapult against said force, and means for releasing said latch to render said catapult effective for projecting the article, a pair of relatively rigid spaced supports stationary with respect to the ground, a loop having a portion adapted for connection with the article and a portion adapted to be suspended with respect to said supports, a loop engaging device adjacent and supported by one of said supports at a point spaced a substantial distance above the lower end thereof, said engaging device comprising finger elements biased toward each other and arranged to receive therebetween a section of the suspended portion of said loop, and means operatively connected to said engaging device and operative by said finger elements upon movement thereof toward each other upon the pulling of the suspended portion of said loop by an airplane-carried element, for operating said latch-releasing device.

10. Apparatus for transferring articles to a moving airplane comprising a catapult, means for exerting a propelling force tending to operate said catapult to project an article carried thereby, a latch for holding said catapult against said force, and means for releasing said latch to render said catapult effective for projecting the article, a pair of relatively rigid spaced supports stationary with respect to the ground, a loop having a portion adapted for connection with the article and a portion adapted to be suspended with respect to said supports, a loop engaging device adjacent and supported by one of said supports at a point spaced a substantial distance above the lower end thereof, said engaging device comprising finger elements biased toward each other and arranged to receive therebetween a section of the suspended portion of said loop, and an electric circuit controlling said latch-releasing means and comprising switch elements carried by said finger elements and engageable to close said circuit upon the pulling of the suspended portion of said loop from between said finger elements by an airplane-carried element, for operating said latch releasing device.

11. Apparatus for transferring articles to a moving airplane comprising a catapult having means for supporting an article to be projected, a flexible loop adapted for connection with the article, a pair of relatively rigid spaced supports stationary with respect to the ground, holding means carried by said supports for holding a portion of the loop suspended for engagement by an airplane-carried element, and means carried by one of said supports and engaging said loop and constructed and arranged to be operative solely by and immediately upon the pulling of the suspended portion of the loop with respect to said supports by the airplane-carried element, for rendering the catapult effective for projecting the article.

12. Apparatus for transferring articles to a moving airplane comprising a catapult having means for supporting an article to be projected, a flexible loop adapted for connection with the article, a pair of relatively rigid spaced supports stationary with respect to the ground, holding means carried by said supports for holding a portion of the loop suspended for engagement by an airplane-carried element, electric circuit controlled means energizable for rendering said catapult operative, and a switch carried by one of said supports and engageable with said loop and constructed and arranged to be closed to energize said electric circuit controlled means solely by and immediately upon the pulling of the suspended portion of the loop with respect to said supports by the airplane-carried element, for rendering the catapult effective for projecting the article.

13. Apparatus for transferring articles to a moving airplane comprising a catapult having means for supporting an article to be projected, a flexible loop adapted for connection with the article, a pair of relatively rigid spaced supports stationary with respect to the ground, holding means carried by said supports for holding a portion of the loop suspended for engagement by an airplane-carried element, an electro-magnetic device energizable for rendering the catapult effective for projecting the article, and means for closing a circuit through said electromagnetic means, comprising switch elements at least one of which is engageable with said loop, said switch elements being carried by one of said supports and movable into engagement with each other upon the pulling of the suspended portion of said loop with respect to said supports by the airplane-carried element, for rendering the catapult effective for projecting the article.

ROY L. COOPER.